US008822386B2

(12) United States Patent
Quintero et al.

(10) Patent No.: US 8,822,386 B2
(45) Date of Patent: Sep. 2, 2014

(54) NANOFLUIDS AND METHODS OF USE FOR DRILLING AND COMPLETION FLUIDS

(75) Inventors: Lirio Quintero, Houston, TX (US); Antonio Enrique Cardenas, Houston, TX (US); David E. Clark, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 318 days.

(21) Appl. No.: 13/166,448

(22) Filed: Jun. 22, 2011

(65) Prior Publication Data
US 2012/0015852 A1     Jan. 19, 2012

Related U.S. Application Data

(60) Provisional application No. 61/359,111, filed on Jun. 28, 2010.

(51) Int. Cl.
  *C09K 8/92* (2006.01)
(52) U.S. Cl.
  USPC ........... 507/117; 507/118; 507/119; 507/124; 507/140
(58) Field of Classification Search
  None
  See application file for complete search history.

(56) References Cited

U.S. PATENT DOCUMENTS

| | | | |
|---|---|---|---|
| 6,703,351 B2 | 3/2004 | Stowe, II et al. | |
| 7,033,975 B2 * | 4/2006 | Baran et al. | 507/102 |
| 7,125,502 B2 | 10/2006 | Smalley et al. | |
| 7,271,131 B2 | 9/2007 | Halliday et al. | |
| 7,393,813 B2 | 7/2008 | Halliday et al. | |
| 7,559,369 B2 | 7/2009 | Roddy et al. | |
| 7,703,531 B2 | 4/2010 | Huang et al. | |
| 2002/0123431 A1 | 9/2002 | Jimenez et al. | |
| 2003/0220204 A1 | 11/2003 | Baran, Jr. et al. | |
| 2005/0115462 A1 | 6/2005 | Disalvo et al. | |
| 2005/0196343 A1 * | 9/2005 | Reddy et al. | 424/9.322 |
| 2006/0205827 A1 | 9/2006 | Deroo et al. | |
| 2006/0270562 A1 | 11/2006 | Xiang et al. | |
| 2008/0075667 A1 * | 3/2008 | Berkland et al. | 424/9.3 |
| 2008/0277116 A1 | 11/2008 | Roddy et al. | |
| 2009/0078153 A1 | 3/2009 | Shchukin et al. | |
| 2009/0082230 A1 * | 3/2009 | Javora et al. | 507/269 |
| 2009/0192053 A1 | 7/2009 | Crews et al. | |
| 2009/0286702 A1 | 11/2009 | Huang et al. | |
| 2009/0312201 A1 | 12/2009 | Huang et al. | |
| 2010/0137168 A1 | 6/2010 | Quintero et al. | |
| 2010/0263866 A1 | 10/2010 | Huang et al. | |
| 2010/0314108 A1 | 12/2010 | Crews et al. | |
| 2011/0000672 A1 | 1/2011 | Huang | |
| 2011/0224110 A1 | 9/2011 | Huang et al. | |

OTHER PUBLICATIONS

Sayyadnejad et al, Removal of hydrogen sulfide by zinc oxide nanoparticles in drilling fluid, Int. J. Environ. Sci. Tech, 2008, 5(4), 665-569.*

L.B. McCusker, et al., "Nomenclature of Structural and Compositional Characteristics of Ordered Microporous and Mesoporous Materials with Inorganic Hosts," Pure Appl. Chem., vol. 73, No. 2, pp. 381-394 (2001).
W.Yu, et al., "The role of interfacial layers in the enhanced thermal conductivity of nanofluids: A renovated Maxwell model", Jnl of Nanoparticle Research 5: 167-171 (2003).
J. Salager, et al., "Nanoemulsions: Where Are They Going to?", Colloidi, Tpoint 2, pp. 12-14 (2003.
C. Lai, et al., "A Mesoporous Silica Nanosphere-Based Carrier System with Chemically Removable CdS Nanoparticle Caps for Stimuli-Responsive Controlled Release of Neurotransmitters and Drug Molecules," J. Am. Chem. Soc., vol. 125, No. 15, pp. 4451-4459 (2003).
C. Barbé et al. in "Silica Particles: A Novel Drug-Delivery System", Adv. Mater., vol. 16, No. 20, pp. 1-8 (Oct. 18, 2004).
Y. Lin, et al., "Well-Ordered Mesoporous Silica Nanoparticles as Cell Markers," Chem. Mater., vol. 17, pp. 4570-4573 (2005).
S Mokhatab, et al., "Applications of Nanotechnology in Oil and Gas E&P", JPT Online, vol. 58, No. 4 (Apr. 2006).
R. Krishnamoorti, "Extracting the Benefits of Nanotechnology for the Oil Industry," JPT Technology Tomorrow, vol. 58, No. 11 (Nov. 2006).
B.G. Trewyn, et al., "Synthesis and Functionalization of a Mesoporous Silica Nanoparticle Based on the Sol-Gel Process and Applications in Controlled Release," Acc. Chem. Res., vol. 40, pp. 846-853 (2007).
B.P. Binks, et al., "Synergistic Interaction in Emulsions Stabilized by a Mixture of Silica Nanoparticles and Cationic Surfactant", Langmuir, 23, pp. 3626-3636 (2007).
B.P. Binks, et al., "Enhanced Stabilization of Emulsions Due to Surfactant-Induced Nanoparticle Flocculation", Langmuir, 23, 7436-7439 (2007).
J. Lagerwall, et al.. "Carbon Nanotubes in Liquid Crystals", J. Mater. Chem., 18, 2890-2898 (2008).
A. Paiaman, et al., "Using nanoparticles to decrease differential pipe sticking and its feasibility in Iranian oil fields", Oil and Gas Business, 6 pp. (2008).
A. Kazemi, et al., "Environmentally Responsive Core/Shell Particles via Electrohydrodynamic Co-jetting of Fully Miscible Polymer Solutions," Small, vol. 4, No. 10, pp. 1756-1762 (2008).

(Continued)

*Primary Examiner* — Susannah Chung
*Assistant Examiner* — Kumar R Bhushan
(74) *Attorney, Agent, or Firm* — Mossman Kumar & Tyler PC (57) ABSTRACT

Nanomaterial compositions are useful for applications in drilling and completion fluids as enhancers of electrical and thermal conductivity, emulsion stabilizers, wellbore strength improvers, drag reduction agents, wettability changers, corrosion coating compositions and the like. These nanomaterials may be dispersed in the liquid phase in low volumetric fraction, particularly as compared to corresponding agents of larger size. Nanofluids (fluids containing nano-sized particles) may be used to drill at least part of the wellbore. Nanofluids for drilling and completion applications may be designed including nanoparticles such as carbon nanotubes. These fluids containing nanomaterials, such as carbon nanotubes, meet the required rheological and filtration properties for application in challenging HPHT drilling and completions operations.

12 Claims, 1 Drawing Sheet

(56) References Cited

OTHER PUBLICATIONS

C. Barras, "Nanotubes Unzip to Offer Computing Route Beyond Silicon," New Scientist (Apr. 2009); available at: http://www.newscientist.com/article/dn16955-nanotubes-unzip-to-offer-computing-route-beyond-silicon.html.

P. Pourafshary, et al., "Priority Assessment of Investment in Development of Nanotechnology in Upstream Petroleum Industry," SPE 126101, SPE 2009, 11 pp., Saudi Arabia Section Technical Symposium and Exhibition (May 9-11, 2009).

M. Amanullah, et al., "Nano-Technology—Its Significance in Smart Fluid Development for Oil and Gas Field Application," SPE 126102, SPE 2009, 12 pp., Saudi Arabia Section Technical Symposium and Exhibition (May 9-11, 2009).

\* cited by examiner

NANOFLUIDS AND METHODS OF USE FOR DRILLING AND COMPLETION FLUIDS

CROSS-REFERENCE TO RELATED APPLICATION

This application claims the benefit of U.S. Provisional Patent Application Ser. No. 61/359,111 filed Jun. 28, 2010, incorporated herein in its entirety by reference.

TECHNICAL FIELD

The present invention relates to drilling fluids and completion fluids for use in wellbores and subterranean reservoirs, and more particularly relates, in one non-limiting embodiment, to drilling fluids and completion fluids which contain nanoparticles of effective type and in sufficient quantity to improve the properties thereof.

BACKGROUND

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The drilling fluid is expected to carry cuttings up from beneath the bit, transport them up the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. It is desirable to minimize the loss into the formation of the relatively expensive drilling fluid. Drilling fluids must also be formulated to stabilize the wellbore wall to keep it from swelling, for instance in the case of drilling through shale. The drilling fluid may also be used to collect and interpret information available from drill cuttings, cores and electrical logs, thus its electrical properties are important. Drilling fluids should also not unnecessarily aggravate the tendency of drill bits, tubulars and other downhole equipment to corrode, and, in a particular non-limiting embodiment, should help prevent such corrosion. It will be appreciated that within the scope of the claimed invention herein, the term "drilling fluid" also encompasses "drill-in fluids", "completion fluids", "work-over fluids" and remediation fluids.

It is apparent to those selecting or using a drilling fluid for oil and/or gas exploration, and field development that an essential component of a selected fluid is that it be properly balanced to achieve the necessary characteristics for the specific end application. Because drilling fluids are called upon to perform a number of tasks simultaneously, this desirable balance is not always easy to achieve. It is also important for the properties of the drilling fluid to be stable, for instance that the rheological properties (viscosity, etc.) are stable throughout the pressure and temperature ranges that the fluid experiences, possibly including high temperature, high pressure conditions which are abbreviated HTHP.

Drilling fluids are typically classified according to their base fluid. In water-based muds, solid particles are suspended in a continuous phase consisting of water or brine. Oil can be emulsified in the water which is the continuous phase. Brine-based drilling fluids, of course are water-based mud (WBM) in which the aqueous component is brine. Oil-based muds (OBM) are the opposite or inverse of water-based muds. In oil-based muds, solid particles are suspended in a continuous phase consisting of oil. Water or brine can be emulsified in the oil and therefore the oil is the continuous phase. Oil-based muds can be either all-oil based or water-in-oil macroemulsions, which are also called invert emulsions. In oil-based mud, the oil may consist of any oil or water-immiscible fluid that may include, but is not limited to, diesel, mineral oil, esters, refinery cuts and blends, or alpha-olefins. OBMs as defined herein also include synthetic-based fluids or muds (SBMs) which are synthetically produced rather than refined from naturally-occurring materials. SBMs often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

Formation damage involves undesirable alteration of the initial characteristics of a producing formation, typically by exposure to drilling fluids, completion fluids or in the production phase of the well. The water or solid particles in the fluids used in drilling and completion operations tend to decrease the pore volume and effective permeability of the producible formation in the near-wellbore region. There may be at least three possible mechanisms at work. First, solid particles from the fluid may physically plug or bridge across flowpaths in the porous formation. Second, when water contacts certain clay minerals in the formation, the clays typically swell, thus increasing in volume and in turn decreasing the pore volume. Third, chemical reactions between the fluid and the formation rock and fluids may precipitate solids or semisolids that plug pore spaces. Phase transitions due to changes in pressure or temperature of fluid composition during the wellbore construction and production may lead to undesirable precipitation or formation of asphaltenes, wax, scales, etc.

Reduced hydrocarbon production can result from reservoir damage when a drilling mud deeply invades the subterranean reservoir. It will also be understood that the drilling fluid, e.g. oil-based mud, is deposited and concentrated at the borehole face and partially inside the formation. Many operators are interested in improving formation clean up and removing the cake or plugging material and/or improving formation damage after drilling into reservoirs with oil-based muds.

It is also important when drilling subterranean formations to keep the wellbore stable, so that the walls of the borehole do not cave into the hole, and that the stability of the walls is maintained. Other issues involve improving the electrical resistivity or otherwise modifying the electrical conductivity of the drilling fluid. In some cases, it is desirable to diminish the drilling fluid resistivity, that is, improve the inverse property or the electrical conductivity of the fluid.

It would be desirable if drilling fluid compositions and methods could be devised to avoid damage to the near-wellbore area of the formation, as well as assess the location and existence of damage and aid and improve the ability to clean up damage and difficulties caused to the wellbore, the formation, equipment in the wellbore (for instance, stuck pipe), and to remove and/or resolve problems more completely and easily, without causing additional damage to the formation, wellbore and/or equipment.

SUMMARY

There is provided, in one non-limiting form, a drilling fluid that includes a base fluid which may be an aqueous fluid, a non-aqueous fluid and/or combinations thereof. The drilling fluid also includes nanoparticles having a size less than 999 nm. Suitable nanoparticles include, but are not necessarily limited to, nano-silica, nano magnesium oxide, nano-iron oxide, nano-manganese oxide, nano-copper oxide, nano-zinc oxide, nano-nickel oxide, nano-alumina, nano-boron, carbon black, nano-graphene, carbon nanotube, ferromagnetic nanoparticles, nanoplatelets of these materials, surface-modified nanoparticles, halloysite clay nanotubes, polymer-based nanoparticles, degradable nanoparticles, nanocapsules, mesoporous nanoparticles, multistimuli-responsive nanospheres, core/shell nanoparticles and combinations of these. By "multistimuli-responsive", it is meant that the nanospheres respond or react to more than one type of stimulus, e.g. pressure, temperature, pH, etc. The drilling fluid may also include a surfactant in an amount effective to suspend the nanoparticles in the base fluid. The amount of nanoparticles in the fluid is associated with its intended function, e.g. the content of nanoparticles present in the fluid to stabilize shale of a subterranean formation adjacent to the wellbore will be inferred from the petrophysical characteristics of the formation and what the intended impact is.

In another non-restrictive version there is provided a drilling fluid that includes a base fluid which may be an aqueous fluid, a non-aqueous fluid and/or combinations thereof. The drilling fluid also includes nanofibers having an average cross-sectional dimension of less than 100 nm and an average particle length of several times (in one non-limiting example, 10 times) the nanofiber diameter. Suitable nanofibers include, but are not necessarily limited to, carbon nanotubes, carbon, graphitized carbon, coated nanofibers, metal oxides, carbide or nitride nanofibers, as well as polymers, including but not limited to polyethylene oxide, polyaramids, polyaniline, polyvinyl alcohol, polystyrene, polyacrylonitrile, nylon, polyester. Nanoparticles may also comprise these materials. The drilling fluid may also optionally include a surfactant in an amount effective to suspend the nanoparticles in the base fluid. The nanoparticles are present in the fluid in an amount effective to affect the electrical, thermal properties of the fluid as compared with an identical drilling fluid absent the nanoparticles, where either resistivity or conductivity is improved or the electrical conductivity of the fluid is otherwise modified.

In another non-limiting embodiment there is provided a drilling fluid which includes a base fluid selected from the group consisting of an aqueous fluid, a non-aqueous fluid and/or combinations thereof. The drilling fluid also contains nanoparticles having an average particle size less than 999, alternatively having an average particle size less than 100 nm. Suitable nanoparticles include, but are not necessarily limited to, materials of nano-silica, nano-barium sulfate, nano-magnesium oxide, nano-iron oxide, nano-copper oxide, nano-zinc oxide, nano-nickel oxide, nano-alumina, nano-boron, carbon black, nano-graphene, carbon nanotube, ferromagnetic nanoparticles; nanoplatelets, surface-modified nanoparticles halloysite clay nanotubes, polymer-based nanoparticles, degradable nanoparticles, nanocapsules, mesoporous nanoparticles, multistimuli-responsive nanospheres, core/shell nanoparticles and combinations of these. The drilling fluid may also contain a surfactant or surfactants, if required, in an amount effective to suspend the nanoparticles in the base fluid. The nanoparticles are present in the fluid in an amount effective to maintain the rheological properties of the fluid over a temperature range of about 0° C. up to about 320° C. and a pressure range of about atmospheric pressure up to about 350 MPa, as compared with an identical drilling fluid absent the nanoparticles.

There is further provided in a different, non-restrictive version, a drilling fluid which contains a base fluid having an aqueous fluid, a non-aqueous fluid and/or combinations thereof, along with nanoparticles having a size less than 999 nm, selected from the group consisting of but are not necessarily limited to nano-silica, magnesium oxide, nano-iron oxide, nano-copper oxide, nano-zinc oxide, nano-nickel oxide, nano-alumina, nano-boron, carbon black, nano-graphene, carbon nanotube, ferromagnetic nanoparticles, nanoplatelets, surface-modified nanoparticles, and combinations thereof. The nanoparticles, which may be nanofibers, are present in the fluid in an amount effective to improve the drag reduction of the fluid as compared with an identical drilling fluid absent the nanoparticles.

Additionally, there is provided in a different non-limiting embodiment an emulsified drilling fluid having a base fluid that contains an emulsion of an aqueous fluid and a non-aqueous fluid. The emulsified drilling fluid includes nanoparticles having a size less than 999 nm of materials such as silica, magnesium, iron oxide, copper oxide, zinc oxide, nickel oxide, alumina, boron, carbon black, graphene, carbon nanotube, ferromagnetic nanoparticles, surface-modified nanoparticles, halloysite clay nanotubes, polymer-based nanoparticles, degradable nanoparticles, nanocapsules, mesoporous nanoparticles, multistimuli-responsive nanospheres, core/shell nanoparticles and combinations thereof. The emulsified drilling fluid contains a surfactant in an amount effective to suspend the nanoparticles in the base fluid. The nanoparticles are present in the fluid in an amount effective to improve the stability of the emulsion as compared with an identical drilling fluid absent the nanoparticles.

Alternatively there is provided in a non-restrictive version, a drilling fluid with a base fluid including either or both of an aqueous fluid and a non-aqueous fluid as well as nanoparticles having a size less than 999 nm. Suitable nanoparticles include, but are not necessarily limited to, nano-silica, nano magnesium oxide, nano-iron oxide, nano-copper oxide, nano-zinc oxide, nano-nickel oxide, nano-alumina, nano-boron, carbon black, nano-graphene, carbon nanotube, ferromagnetic nanoparticles, nanoplatelets, surface modified-nanoparticles, halloysite clay nanotubes, polymer-based nanoparticles, degradable nanoparticles, nanocapsules, mesoporous nanoparticles, multistimuli-responsive nanospheres, core/shell nanoparticles and combinations of these, as well as a surfactant if required in an amount effective to suspend the nanoparticles in the base fluid. The nanoparticles are present in the fluid in an amount effective to reverse the wettability of a downhole material selected from the group consisting of filter cake, drill cuttings, wellbore surfaces, casing, metal surfaces, such as the surfaces of downhole equipment, and combinations thereof.

Further there is provided in another non-limiting embodiment, an equipment/drilling fluid combination having improved corrosion resistance. The drilling fluid includes a base fluid which may include an aqueous fluid and/or a non-aqueous fluid. The drilling fluid also includes nanoparticles having a size less than 999 nm. Suitable nanoparticles include, but are not necessarily limited to, nano-silica, nano-magnesium oxide, nano-iron oxide, nano-copper oxide, nano-zinc oxide, nano-nickel oxide, nano-alumina, nano-boron, carbon black, nano-graphene, carbon nanotube, ferromagnetic nanoparticles, nanoplatelets, surface modified nanoparticles, halloysite clay nanotubes, polymer-based nanoparticles, degradable nanoparticles, nanocapsules, mesoporous nanoparticles, multistimuli-responsive nanospheres, core/shell nanoparticles and combinations of these. The drilling fluid may also contain an optional surfactant in an amount effective to suspend the nanoparticles in the base fluid. The drilling fluid is in contact with equipment at least partially composed of a material which may be stainless steel, duplex steel, chrome steel, martensitic alloy steels, ferritic alloy steels, austenitic stainless steels, precipitation-hardened stainless steels, high nickel content steels, and combinations thereof. The nanoparticles are present in the fluid in an amount effective to improve the corrosion resistance of (lessen the corrosion of) the equipment as compared with an identical drilling fluid absent the nanoparticles. In this non-limiting embodiment the nanoparticles may include, but are not necessarily limited to scavenger materials for oxygen, hydrogen sulfide ($H_2S$), carbon dioxide, carbonyl sulfide (COS), hydrogen cyanide (HCN), carbon disulfide ($CS_2$) and mixtures thereof.

In another non-limiting embodiment there is provided a drilling fluid which includes a base fluid which may include an aqueous fluid, a non-aqueous fluid and/or combinations thereof. The drilling fluid also contains nanoparticles having an average particle size less than 999 nm. Suitable nanoparticles include, but not limited to, nano-silica, magnesium oxide, nano-iron oxide, nano-copper oxide, nano-zinc oxide, nano-nickel oxide, nano-alumina, nano-boron, carbon black, nano-graphene, carbon nanotube, ferromagnetic nanoparticles, nanoplatelets, surface-modified nanoparticles, halloysite clay nanotubes, polymer-based degradable nanoparticles, nanocapsules, multistimuli-responsive nanospheres, core/shell nanoparticles and combinations thereof, containing at least one encapsulated additive including but not necessarily limited to, wax and asphaltene inhibitors, shale stabilizers, corrosion inhibitors, rate of penetration (ROP) enhancers, scale inhibitors, hydrate inhibitors, biocides, lubricants, additives for acid treatment, cross linking agents, chemicals to treat acid gases, tracers, gel forming polymers and the like.

Alternatively there is provided in a non-restrictive version, a drilling fluid with a base fluid including either or both of an aqueous fluid and a non-aqueous fluid as well as nanoparticles having a size less than 999 nm selected from a group including but not limited to nano-silica, magnesium oxide, nano-iron oxide, nano-copper oxide, nano-zinc oxide, nano-alumina, nano-boron, carbon black, nano-graphene, carbon nanotube, ferromagnetic nanoparticles, nanoplatelets, surface-modified nanoparticles, halloysite clay nanotubes, polymer-based degradable nanoparticles, nanocapsules, multi-stimuli-responsive nanospheres, core/shell nanoparticles and combinations thereof, containing encapsulated corrosion inhibitors including but not necessarily limited to scavenger materials for oxygen, hydrogen sulfide ($H_2S$), carbon dioxide, carbonyl sulfide (COS), hydrogen cyanide (HCN), carbon disulfide ($CS_2$), and mixtures thereof. The encapsulated corrosion inhibitor is released when the nanoparticle is subjected to a specific triggering mechanism providing a self-healing corrosion protection. The triggering mechanism includes but is not necessary limited to changes of pH, temperature, electrolyte type or concentration, or application of a magnetic or electromagnetic field.

There may be additionally provided in another non-restrictive version, a completion fluid that includes a base fluid which may be an aqueous fluid and/or a non-aqueous fluid. The completion fluid also includes nanoparticles having a size less than 100 nm, selected from the group consisting of nano-silica, magnesium oxide and other nano-oxides, nano-iron oxide, nano-copper oxide, nano-zinc oxide, nano-nickel oxide, nano-alumina, nano-boron, carbon black, nano-graphene, carbon nanotubes and other carbon-based materials, ferromagnetic nanoparticles, nanoplatelets, surface-modified nanoparticles, along with an optional surfactant in an amount effective to suspend the nanoparticles in the base fluid. The nanoparticles are present in the fluid in an amount effective to improve fluid loss by increasing the viscosity as compared with an identical drilling fluid absent the nanoparticles.

Also there is provided in a different non-limiting embodiment a drilling fluid that contains a base fluid that is an aqueous fluid and/or a non-aqueous fluid. The drilling fluid also includes nanoparticles having a size less than 999 nm, selected from the group consisting of nano-silica, magnesium oxide, nano-iron oxide, nano-copper oxide, nano-zinc oxide, nano-nickel oxide, nano-alumina, nano-boron, carbon black, nano-graphene, carbon nanotube, ferromagnetic nanoparticles, nanoplatelets, surface-modified nanoparticles and combinations thereof. The drilling fluid additionally includes a surfactant in an amount effective to suspend the nanoparticles in the base fluid. The nanoparticles are present in the fluid in an amount effective to improve lost circulation as compared with an identical drilling fluid absent the nanoparticles.

In another non-limiting embodiment there is provided a drilling fluid which includes a base fluid selected from the group consisting of an aqueous fluid, a non-aqueous fluid and/or combinations thereof. The drilling fluid also contains nanoparticles having an average particle size less than 999, alternatively having an average particle size less than 100 nm, which nanoparticles include materials of nano-silica, nano-barium sulfate, nano-magnesium oxide, nano-iron oxide, nano-copper oxide, nano-zinc oxide, nano-nickel oxide, nano-alumina, nano-boron, carbon black, nano-graphene, carbon nanotube, ferromagnetic nanoparticles, nanoplatelets, surface-modified nanoparticles, halloysite clay nanotubes, polymer-based degradable nanoparticles, nanocapsules, multistimuli-responsive nano-spheres, core/shell nanoparticles and combination thereof. The nanoparticles present in the fluid contain encapsulated or incorporated therein a gel forming additive including but not limited to polyacrylamide, crosslinking agents, in situ crosslinkable polymers, superabsorbent polymers and the like that are released by applying a triggering mechanism which includes but is not necessary limited to changes of pH, temperature, electrolyte type or concentration, or application of a magnetic or electromagnetic field. Such triggering would release and allow the encapsulated gel forming additive to activate to form gel, hydrate and expand in the presence of formation water, plugging the pores and blocking water movement and dehydrating and shrinking when contacting oil, hence allowing the oil to flow.

DETAILED DESCRIPTION

Nano-material compositions have been discovered as useful for applications in drilling and completion fluids as enhancers of electrical and thermal conductivity, emulsion stabilizers, wellbore strengthening components, drag reducers, wettability changers, as corrosion-inhibiting coatings, etc. It has been found that the nanofluids for drilling and completion applications may be designed by adding nano-composites and/or organic and inorganic nano-particulate materials, such as carbon nanotubes, functionalized nanotubes, nanospheres, nano magnesium oxide, nano barium sulfate, nano-nickel oxide, nano-silica, nano-iron oxide, metal nanoparticles, surface-modified nanoparticles, halloysite clay nanotubes, polymer-based nanoparticles, degradable nanoparticles, nanocapsules, mesoporous nanoparticles, multistimuli-responsive nanospheres, core/shell nanoparticles and the like and their combinations. The use of surfactants together with nanoparticles may form self-assembly structures that enhance the thermodynamic, physical, and rheological properties of drilling and completion fluids. The use of surfactants is optional. These nanomaterials are dispersed in the liquid phase, typically in low volumetric fraction. The liquid phase may be any liquid, such as an aqueous phase or non-aqueous phase, or mixtures such as an emulsion of oil-in-water (O/W) or water-in-oil (W/O). The nanofluids may be used in conventional operations and in challenging drilling and completions operations that require stable fluids for high temperature and pressure conditions (HTHP). Within the context of this application, the term "mesoporous" refers to a material containing pores with diameters between about 2 and about 50 nm.

In the present context, nanoparticles are defined as having at least one dimension less than 999 nm, although other dimensions may be larger than this. In one non-limiting instance, in the case of carbon nanotubes (single wall or multiwall), the smallest dimension may be less than 100 nm, for instance, the diameter of the nanotubes, but the length of the nanotubes may be much longer than 100 nm, for instance 1000 nm or more. Such nanoparticles would be within the scope of the drilling and completion fluids herein.

The dimensions of nanoparticles are on an atomic scale. One nanometer is one millionth of a millimeter, which corresponds to the width of ten hydrogen atoms. Nanoparticles in nature are ultrafine, usually larger than atom clusters, but smaller than ordinary microparticles. While materials on a micron scale have properties similar to the larger materials from which they are derived, assuming homogeneous composition, the same is not true of nanoparticles. An immediate example is the very large interfacial or surface area per volume for nanoparticles. The consequence of this phenomenon is a very large potential for interaction with other matter, as a function of volume. For short carbon fibers, the surface areas may be as small as about 1 $m^2/g$, whereas for multiwall nanotubes (MWNTs), the surface area may range from about 40 to about 300 $m^2/g$, but may be up to about 1315 $m^2/g$ for a single-wall nanotubes (SWNT) or up to about 1800 $m^2/g$ for graphene (a one-atom-thick planar sheet of $sp^2$-bonded carbon atoms that are densely packed in a honeycomb crystal lattice; a sort of atomic scale "chicken wire" made of carbon atoms and their bonds).

In general, MWNTs are easier to manufacture than SWNTs and are thus relatively cheaper and more plentiful. However, SWNTs are more valued because they can be more precisely engineered, for instance to contain certain desired functional groups in more precise proportion. Split or cleaved nanotubes may provide "nanoribbons", similar to graphene, but in a longitudinal strip form. The potential for such nanoribbons or nanostrips is that the edge sites may be more easily reacted with various reactants to give functional groups as compared with reacting the surface atoms of SWNTs or MWNTs. Techniques to cleave or split a nanotube (e.g. as described by J. Tour (Rice University), or M. Torrones (Instituto Potosino de Investigación Científica y Tecnológica, Mexico), or H. Dai (Stanford University) and/or others) involve methods that longitudinally "unzip" a nanotube, resulting in a "nano-sheet" of graphene. More information may be found in C. BARRAS, "Nanotubes Unzip to Offer Computing Route Beyond Silicon," New *Scientist*, April, 2009, available at: http://www.newscientist.com/article/dn16955-nanotubes-unzip-to-offer-computing-route-beyond-silicon.html, incorporated herein by reference in its entirety. Other shapes may be useful in the compositions and methods herein, including, but not necessarily limited to, nano-sized platelets or nanoplatelets.

Nevertheless, it should be understood that surface-modified nanoparticles, including but not necessarily limited to, surface-modified nanoplatelets, surface-modified nanoribbons, surface-modified nanostrips, etc. may find utility in the compositions and methods herein. "Surface-modification" is defined here as the process of altering or modifying the surface properties of a particle by any means, including but not limited to physical, chemical, electrochemical or mechanical means, and with the intent to provide a unique desirable property or combination of properties to the surface of the particle, which differs from the properties of the surface of the unprocessed particle.

Functionalized nanoparticles are defined herein as those which have had their edges or surfaces modified to contain at least one functional group including, but not necessarily limited to, sulfonate, sulfate, sulfosuccinate, thiosulfate, succinate, carboxylate, hydroxyl, glucoside, ethoxylate, propoxylate, phosphate, ethoxylate, ether, amines, amides, and combinations thereof.

Nanoparticles composed of other materials besides carbon-carbon lattices will also be useful, for instance calcium carbonate nanoparticles, which in turn suggests that potassium carbonate nanoparticles may also be beneficial. Other suitable nanoparticle materials include, but are not necessarily limited to, $TiO_2$, $Al_2O_3$, $MgO$ and/or $Mg(OH)_2$, $FeO$, $Fe_2O_3$, $Fe_3O_4$, $CuO$, $SiO_2$, $ZnO$, $CeO_2$, $Mn_3O_4$, $SiC$, $Si_3N_4$, and the like.

These enormous surface areas per volume dramatically increase the interaction of the nanoparticles with the matrix or surrounding fluid. This surface area may serve as sites for bonding with functional groups, including polymerization, and can influence crystallization, chain entanglement, and morphology, and thus can generate a variety of properties in the matrix. In the present context, the matrix includes the base fluid of a drilling fluid or a completion fluid. For instance, it is anticipated that nanoparticles and conventional polymers may be linked or bonded together directly or through certain intermediate chemical linkages to combine some of the advantageous properties of each. Similarly, polymers may be connected with nanoparticles in particular ways, such as by spiral wrapping of a polymer around a carbon nanotube. It may be necessary to modify the nanotube surface to achieve such a structure. Suitable polymers include, but are not necessarily limited to, poly(m-phenylenevinylene-co-2,5-dioctoxy-p-phenylenevinylene) (PmPV), polyaniline, poly(para-phenylenevinylene) (PPV), poly(methyl methacrylate) (PMMA), polyvinyl alcohol (PVA), and the like. Such nanoparticle-polymer hybrids may use nanoparticles and nanotubes as polymer-type building blocks in conventional copolymer-type structures, such as block copolymers, graft copolymers, cross-linking at the side of a nanotube, e.g. and the like.

Additionally, because of the very large surface area to volume present in nanoparticles, it is expected that in most, if not all cases, much less proportion of nanoparticles need be employed relative to micron-sized additives conventionally used to achieve or accomplish a similar effect.

Further, certain nanoparticles (e.g. MgO and/or Mg(OH)$_2$, and the like), appear to connect with or associate with other small particles and surfaces, such as clay and non-clay particles, including charged and non-charged particles. Since nanoparticles are so small, the charge density per unit volume is very large. Due to at least in part to their small size, the surface forces (like van der Waals and electrostatic forces) of nanoparticles help them associate, group or flocculate fine particles together in larger collections, associations or agglomerations in ways different from their micro-size counterparts. Such charges and forces may help secure such small particles to a larger surface or substrate, for instance, to help stabilize a borehole wall.

In another non-limiting embodiment, degradable nanoparticles are nanoparticles which degrade, cleave or break down into smaller particles which themselves are useful or degrade, cleave or break to allow the controlled release of encapsulated one or more water-soluble, or oil-soluble additives including but not necessarily limited to, wax and asphaltene inhibitors, shale stabilizers, corrosion inhibitors, rate of penetration (ROP) enhancers, scale inhibitors, hydrate inhibitors, biocides, lubricants, additives for acid treatment, cross linking agents, chemicals to treat acid gases, tracers, gel forming polymers and the like. One non-restrictive example is a polymer nanoparticle that cleaves into two subgroups or moieties, one or both of which have useful functionality. Examples of degradable nanoparticles may be found in U.S. Patent Application 2005/0196343 A1 which relates to methods of producing polymeric degradable nanoparticles used in drug and agent delivery, as well as imaging and diagnosis. This patent is incorporated by reference herein in its entirety.

In one sense, drilling fluids have made use of nanoparticles for many years, since the clays commonly used in drilling muds are naturally-occurring, 1 nm thick discs of aluminosilicates. Such nanoparticles exhibit extraordinary rheological properties in water and oil. However, in contrast, the nanoparticles that are the main topic herein are synthetically formed nanoparticles where size, shape and chemical composition are carefully controlled.

It is known to modify nanoparticles, particularly carbon nanotubes, to introduce chemical functional groups thereon, particularly on the outer surface of the nanotube, for instance by reacting the nanotube with a peroxide such as diacyl peroxide to add acyl groups which are in turn reacted with diamines to give amine functionality, which may be further reacted. Covalent functionalization includes, but is not necessarily limited to, oxidation and subsequent chemical modification of oxidized nanotubes, fluorination, reactions of fluoronanotubes, free radical additions, addition of carbenes, nitrenes and other radicals, arylamine attachment via diazonium chemistry, and the like. Besides covalent functionalization, chemical functionality may be introduced by noncovalent functionalization, π-π interactions and polymer interactions, such as wrapping a nanotube with a polymer, direct attachment of reactants to carbon NT sidewalls by attacking the sp$^2$ bonds, direct attachment to open ends of nanotubes or to the edges of a cleaved or split nano-tubes, and the like.

The drilling fluids herein, which may include completion fluids, except as noted, may contain nanoparticles which beneficially affect the properties of the drilling fluid, and in some cases may change the properties of the drilling fluids in which they reside, based on various stimuli including, but not necessarily limited to, temperature, pressure, pH, chemical composition, salinity, and the like. Such fluids are sometimes termed "smart fluids". This is due to the fact that the nanoparticles can be custom designed on an atomic level to have very specific functional groups, and thus the nanoparticles react to a change in surroundings or conditions in a way that is beneficial. It should be understood that it is expected that nanoparticles may have more than one type of functional group, making them multifunctional. Multi-functional nanoparticles may be useful for simultaneous applications, in a non-limiting example of a drilling fluid, lubricating the bit, stabilizing the shale while drilling and provide low shear rate viscosity. In another non-restrictive embodiment, nanoparticles suitable for stabilizing shale include those having an electric charge that permits them to associate with the shale.

Such drilling fluids are expected to have surfactants, such as surfactants and/or polymers present and interacting with the nanoparticles to help the fluids achieve these goals. Such fluids are expected to find uses in fluid flooding, reservoir conformance, and completion fluids. Designing specific hydrophobic or hydrophilic character into such drilling fluids, such as through the use of novel organic chemistry on the surface of the very high surface area functionalized nanoparticles is expected to significantly alter the operating and organizing of water floods, surfactant floods, stabilizing drilling fluids, fluids to change the wettability of surfaces downhole, stabilizing drilling fluids, and the like. Drilling fluids containing such carefully designed nanoparticles are expected to either block or increase the porosity of the formations into which they are injected. Such engineered nanoparticles, e.g. nanocrystalline materials, in these drilling fluids are expected to increase drilling speeds through subterranean formations and decrease the wear of drilling parts significantly.

It may be helpful in designing new drilling fluids containing engineered nanoparticles to match the nanoparticle type with the proper surfactant to achieve dispersion for the particular drilling fluid. Surfactants are generally considered optional, but may be used to improve the quality of the dispersion, e.g. a dispersion of barite or magnesium oxide nanoparticles. Ways of dispersing colloidal-size particles in drilling fluids is known, but how to disperse nanoparticles at the low shear rate viscosities experienced by drilling fluids may be a challenge, that is, how to disperse nanoparticles with little or no shear, except when they are subject to high shear when ejected through jets in the drill bit. Expected suitable surfactants include, but are not necessarily limited to non-ionic, anionic, cationic and amphoteric surfactants and blends thereof. Suitable nonionic surfactants include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable anionic surfactants selected from the group consisting of alkali metal alkyl sulfates, alkyl ether sulfonates, alkyl sulfonates, alkyl aryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters. Suitable cationic surfactants include, but are not necessarily limited to, arginine methyl esters, alkanolamines and alkylenediamides. Suitable surfactants may also include surfactants containing a non-ionic spacer-arm central extension and an ionic or nonionic polar group. Other suitable surfactants are dimeric or gemini surfactants and cleavable surfactants.

It is also anticipated that combinations of certain surfactants and nanoparticles will "self-assemble" into useful structures, similar to the way certain compositions containing surfactants self-assemble into liquid crystals of various different structures and orientations. It is expected that nanotubes will align along the director of the micelle forming the liquid crystal phase. Further details may be found in Lagerwall and Scalia. "Carbon Nanotubes in Liquid Crystals", *J. Mater. Chem.*, 2008, 18, 2890-2898, incorporated herein by reference in its entirety.

In one non-limiting example a drilling fluid containing nanoparticles is expected to be useful to stabilize the wellbore during drilling, particularly the shale regions encountered during drilling which may contain areas that tend to slough into the borehole or have clays which undesirably swell when contacted with water introduced as part of the drilling fluid. Such a drilling fluid may be an aqueous-based fluid such as a WBM, a non-aqueous based fluid such as an OBM or SBM, or a combination thereof, namely an emulsion. A surfactant may be present in an amount effective to suspend the nanoparticles in the fluid. Nanoparticles expected to be useful in such shale stabilizing fluids are those which contain functionalities that associate with the shale and help keep it in its original condition or as close to its original condition as possible, that is strengthen the borehole wall. Nanoparticles having a surface charge may assist with this shale stabilization, such as carbon nanotubes. Further, the small size of the nanoparticles permits them excellent access to the shale matrix to inhibit both the external and internal surfaces of clays to minimize damage to the structure of the shale. Such nanoparticles include, but are not necessarily limited to, carbon nanotubes, such as single wall and multiwall carbon nanotubes (SWNTs and MWNTs) which have been chemically reacted to bear functional groups including, but not necessarily limited to, SH, $NH_2$, NHCO, OH, COOH, F, Br, Cl, I, H, R—NH, R—O, R—S, CO, COCl and SOCl, where R is selected from the group consisting of low molecular weight organic chains with a carbon number on average but not necessarily limited to 10 or less. Other nanoparticles for shale stabilization include, but are not necessarily limited to, carbon nanotubes, functionalized carbon nanotubes, deformable polymer latex nanoparticles selected from a group including, but not limited to, polyethylene, polymethyl methacrylate, carboxylated styrene/butadiene copolymer, polyvinylacetate copolymer, polyvinyl acetate/vinyl chloride/ethylene copolymer, polyvinyl acetate/ethylene copolymer, natural latex, polyisoprene, polydimethylsiloxane and mixtures thereof. The amount of nanoparticles in such shale-stabilizing fluids may range from about 5 ppm to about 150,000 ppm, and from about 5 ppm to about 50,000 ppm in an alternate non-limiting embodiment. Surfactants useful to suspend such nanoparticles in shale stabilizing fluids include, but are not necessarily limited to those previously identified. Such surfactants may be present in the drilling fluids in amounts from about 10 ppm to about 100,000 ppm. Improving the stability of deep wellbores that experience HTHP conditions is particularly important.

Drilling fluids containing certain nanoparticles and/or nanofibers are also expected to have improved electrical conductivity. In this application, nanofibers are expected to be useful where the nanofibers have an average cross-sectional dimension of less than 100 nm but have an average particle length of several times its cross-sectional dimension. In one non-restrictive version, the average particle length is at least five times the cross-sectional dimension, alternatively at least 10 times the cross-sectional dimension. In some cases, it is easier to manufacture nanofibers of relatively long length than particulates which are of nanoscale in all dimensions.

For small contents of nanofibers, the electrical conductivity of the fluid slowly increases with increasing the content of nanofiber in the fluid. At the percolation limit, the nanofibers are expected to associate in such a way as to form electrically conductive pathways in the drilling fluid, resulting in a fast increase in conductivity. Suitable materials for nanofibers to improve conductivity include, but are not necessarily limited to carbon, graphite, graphitized carbon, coated nanofibers, polyaniline composites, functionalized carbon nanotubes. Nanofibers, such as carbon nanotubes which can bear an electrical charge are expected to improve the conductivity of the drilling fluids. Enhanced electrical conductivity drilling fluids may form an electrically conductive filter cake that highly improves real time high resolution log while drilling processes, as compared with an otherwise identical fluid absent the nanoparticles.

Suitable materials for nanofibers may be used to modify electrical conductivity. Modifying electrical conductivity includes both improving electrical conductivity and improving electrical resistivity. Such materials for modifying electrical conductivity include, but are not necessarily limited to carbon, graphite, polyaniline composites, functionalized carbon nanotubes. The amount of nanofibers in a drilling fluid to modify the electrical conductivity of the fluid may range from about 5 ppm to about 150,000 ppm alternatively from about 5 ppm to about 50,000 ppm. Surfactants useful to include in drilling fluids to improve the conductivity or resistivity thereof are expected to include, but not necessarily be limited to, non-ionic, anionic, cationic and amphoteric surfactants and blends thereof, and may be expected to be present in amounts of from about 10 ppm to about 100,000 ppm.

Coated nanofibers include, but are not necessarily limited to, the above-noted nanofibers coated with one or more materials including, but not necessarily limited to, metal oxide, copper, aluminum, zinc, titanium, polymers, stimuli responsive polymers, surfactants, conducting fluids, hydrophilic agents, hydrophobic agents, and combinations thereof.

Nanoparticles are also expected to be able to stabilize drilling fluids over a wide range of temperature and/or pressure conditions, including the HTHP environments of very deep wells, and at proportions much less than current stability additives. By stabilizing the drilling fluids is meant keeping the rheology of the fluid the same, such as the viscosity of the fluid, over these ranges. In one non-limiting embodiment the temperature range is from about 175° C. independently to about 320° C.; alternatively from about 175° C. independently to about 275° C. Similarly, in another non-restrictive version, the pressure may range from about 100 MPa independently to about 350 MPa; alternatively from about 100 MPa independently to about 240 MPa. As used herein with respect to ranges, the term "independently" means that any lower threshold may be combined with any upper threshold to give a suitable alternative range.

Nano size colloidal particles may act as an emulsion stabilizer if they are adsorbed to a fluid-fluid interface, and promote emulsion stabilization. The type of emulsion obtained would depend on the wettability of the particles at the oil/water interface. The stabilization mechanism works via a viscoelastic interfacial film formed by the small particles residing at the oil/water interface, reducing drainage and rupture of the film between droplets. The degree of stabilization would depend on the particle detachment energy which is related to the free energies involved in removing an adsorbed nanoparticle from the interface. In one non-limiting embodiment the stabilization of the emulsion forming the drilling fluid may involve surfactant-induced nanoparticle flocculation and synergy between the surfactant and the nanoparticles as described by Binks, et al., "*Synergistic Interaction in Emulsions Stabilized by a Mixture of Silica Nanoparticles and Cationic Surfactant*", Langmuir 2007, 23, 3626-3636 and Binks and Rodrigues, "*Enhanced Stabilization of Emulsions Due to Surfactant-Induced Nanoparticle Flocculation*", Langmuir 2007, 23, 7436-7439, both incorporated herein by reference in their entirety. In one non-limiting embodiment, the drilling fluid would be stable at temperatures up to 370° C. and over a pressure range of about atmospheric pressure up to about 350 MPa. Suitable nanoparticles for this application include, but are not necessarily limited to, those which can carry a charge, as well as those with functional groups including, but not necessarily limited to, hydrophilic groups and/or hydrophobic groups, etc. It is expected that the proportions of such nanoparticles useful to impart stability may range from about 5 to about 150,000 ppm; alternatively from about 5 to about 50,000 ppm. These drilling fluids would be more stable than otherwise identical fluids absent the nanoparticles. Particular nanoparticles useful to stabilize emulsions include, but are not necessarily limited to, carbon nanotubes, functionalized carbon nanotubes, deformable polymer latex, nanoparticles such as but not limited to magnesium oxide, barium sulfate and polydimethylsiloxane and combinations thereof.

It is further expected that drilling fluids containing certain kinds of nanoparticles would have improved drag reduction (reduced frictional fluid flow) as compared with such drag reducing fluids without nanoparticles. This drag reduction behavior may be similar to that provided by certain very high molecular weight polymers, although different polymers are used respectively for aqueous fluids and non-aqueous fluids. The drag reducing mechanism may be such that the nanoparticles roll within the fluid in the contact regions changing and/or sliding into more efficient rolling-friction configurations, patterns or structures at the nanoscale. Another probable mechanism includes an enhanced adhesion-film between the sliding surfaces preventing direct contact of the surfaces and reducing the frictional force between the surfaces. It would thus be expected that different nanoparticles may be useful for different fluid types, however, multifunctional nanoparticles may be particularly useful to reduce the drag of emulsions containing both oil and water. Very long nanofibers, that is, those which have average diameters of less than 100 nm, but which are much longer than 100 nm, for instance on the order of about 2,000 to about 5,000 nm may thus provide a drag reducing effect analogous to polymers. Drag reducing polymers are generally in the range of about 40 nm long. Narrow nanoribbons or nanostrips may also provide such an effect. Nanoparticles suitable to provide drag reduction include, but are not necessarily limited to, carbon-based nanoparticles, metallic-based nanoparticles including Ni-based nanoparticles, and those nanoparticles with functional groups selected from the group including, but not limited to, SH, $NH_2$, NHCO, OH, COOH, F, Br, Cl, I, H, R—NH, R—O, R—S, CO, COCl and SOCl, where R is as defined above. It is expected that the proportions of such nanoparticles useful to improve drag may range from about 5 to about 150,000 ppm; alternatively from about 5 to about 50,000 ppm.

As described, many drilling fluids are emulsions, such as O/W or W/O emulsions. It is important that these emulsion drilling fluids maintain their emulsion properties during their use. Surfactants or combinations of surfactants with co-surfactants are often used in conventional emulsion drilling fluids to stabilize them. However, it is expected that dual or multifunctional nanoparticles could also provide this emulsion stabilizing effect in a much lower proportion. The nanoparticles may have both hydrophilic and hydrophobic groups and provide greater stability as compared with the case where nanoparticles are not used in an otherwise identical fluid, or the case where conventional stabilizers are used in an otherwise identical fluid in the same proportion as the nanoparticles. Other nanoparticles believed to be useful in changing the wettability of downhole surfaces include, but are not necessarily limited to, magnesium oxide, block copolymers described in U.S. Patent Application Publication No. 2006/0205827 incorporated herein by reference in its entirety, functionalized nanoclays, silicates and aluminas described in U.S. Patent Application Publication No. 2005/0115462 and the like and combinations thereof. It is expected that the proportions of such nanoparticles useful to impart emulsion stability may range from about 5 to about 100,000 ppm; alternatively from about 5 to about 50,000 ppm. Nanoparticles suitable to reverse the wettability of downhole materials may include, but are not necessarily limited to those having a size less than 999 nm, and may be silica, magnesium oxide, iron oxide, copper oxide, zinc oxide, alumina, boron, carbon black, graphene, carbon nanotubes, ferromagnetic nanoparticles, nanoplatelets, surface modified nanoparticles; which may be optionally functionalized with functional group including, but not necessarily limited to, sulfonate, sulfate, sulfosuccinate, thiosulfate, succinate, carboxylate, hydroxyl, glucoside, ethoxylate, propoxylate, phosphate, ethoxylate, ether, amines, amides and combinations thereof.

Nanoparticles that are bifunctional have been termed "Janus" particles because they may be of platelet shape where the functional groups on one side are hydrophobic and the functional groups on the other side are hydrophilic. This bifunctionality is expected to exist with other nanoparticles such as carbon SWNTs or MWNTs where one end of the tube has primarily or exclusively hydrophobic functional groups and the other end of the tube has primarily or exclusively hydrophilic functional groups. Such bifunctional nanoparticles, as well as nanoparticles which carry a charge, are expected to be useful to change the wettability of surfaces downhole, such as filter cakes, drill cuttings, wellbore surfaces, deposits which cause stuck pipe (primarily filter cakes, but other deposits may also cause problems). Such wettability changes, for instance from oil-wet to water-wet are useful to remove damage (e.g. near wellbore damage) and other structures downhole (e.g. filter cakes), and release stuck pipe. Such bifunctional nanoparticles may be used alone or together with conventional surfactants, co-surfactants and/or co-solvents. It is expected that the proportions of such nanoparticles useful to change the wettability of surfaces downhole may range from about 5 to about 100,000 ppm; alternatively from about 5 to about 50,000 ppm.

It is also expected that other tools, tubular goods and equipment downhole may have their resistance to corrosion improved by nanoparticle additives to the drilling fluid used. Indeed, there may be a beneficial reaction, association or correspondence with certain tubular and/or tool surfaces and nanoparticles in the drilling fluid, such as through a charge on the nanoparticles, as previously discussed, or by the presence of certain functional groups on the nanoparticle. It would be useful if such corrosion resistance improvement methods could be applied to current metallurgies, including, but not necessarily limited to, stainless steel, duplex steel, chrome steel, martensitic alloy steels, ferritic alloy steels, austenitic stainless steels, precipitation-hardened stainless steels, high nickel content steels, and combinations thereof, as well as be applicable to metallurgies to be developed in the future. Useful nanoparticles for improving corrosion resistance include, but are not necessarily limited to, oxides of aluminum, silicon, scandium, titanium, yttrium, zirconium, niobium, lanthanum, hafnium, tantalum or thorium or other rare-earth elements). In this non-limiting embodiment the nanoparticles may include, but not necessarily limited to, scavenger materials for oxygen, hydrogen sulfide ($H_2S$), carbon dioxide, carbonyl sulfide (COS), hydrogen cyanide (HCN), carbon disulfide ($CS_2$) and mixtures thereof. It is additionally expected that the proportions of such nanoparticles useful to improve the corrosion resistance of downhole tools and tubular goods may range from about 5 to about 100,000 ppm; alternatively from about 5 to about 20,000 ppm.

It is additionally expected that fluids may contain nanoparticles which are nanocapsules that contain useful materials that may be delivered at a remote location, such as downhole. Again, the nanoparticles may have an average particle size less than 999. Suitable nanoparticles include, but not limited to, nano-silica, magnesium oxide, nano-iron oxide, nano-copper oxide, nano-zinc oxide, nano-alumina, nano-boron, carbon black, nano-graphene, carbon nanotube, ferromagnetic nanoparticles, nanoplatelets, surface-modified nanoparticles, halloysite clay nanotubes, polymer-based degradable nanoparticles, nanocapsules, multistimuli-responsive nanospheres, core/shell nanoparticles and combinations thereof. In particular core/shell nanoparticles and other structures may contain encapsulated additives including, but not necessarily limited to, wax and asphaltene inhibitors, shale stabilizers, corrosion inhibitors, rate of penetration (ROP) enhancers, scale inhibitors, hydrate inhibitors, biocides, lubricants, additives for acid treatment, cross linking agents, chemicals to treat acid gases, tracers, gel forming polymers and the like. Controlling the delivery of the additive downhole or in a subterranean formation and its distribution both in space and time aims to increase the additive overall efficacy embodies both controlling the rate of release as well as the triggering release mechanism which includes, but is not necessary limited to, changes of pH, temperature, electrolyte type or concentration, or application of a magnetic field or electromagnetic field and/or combinations thereof. Further information about core/shell particles on a nano-scale may be had with reference to A. Kazemi, et al., "Environmentally Responsive Core/Shell Particles via Electrohydrodynamic Co-jetting of Fully Miscible Polymer Solutions," *Small*, 2008, Volume 4, No. 10, pp. 1756-1762, incorporated by reference herein in its entirety. Drug delivery methods using silica nanoparticles have been described by C. Barbé, et al. in "Silica Particles: A Novel Drug-Delivery System", Adv. Mater., Oct. 18, 2004, Vol. 16, No. 20, pp. 1-8, incorporated by reference herein in its entirety since such methods are expected to be applicable to delivering an agent or material downhole at a remote location.

It should also be recognized that other useful materials may be included in the nanocapsules, including, but not necessarily limited to, the nanoparticles effective to stabilize shale, the nanofibers effective to modify electrical conductivity, the nanoparticles effective to stabilize drilling fluid rheology, the nanoparticles effective to improve drag reduction, the nanoparticles effective to improve emulsion stability, the nanoparticles effective to reverse wettability, the nanoparticles effective to inhibit or prevent corrosion, the nanoparticles effective to prevent fluid loss, the nanoparticles effective to improve lost circulation, the nanoparticles effective to inhibit or prevent water flow, all as described elsewhere herein.

In another application, nanoparticles may encapsulate corrosion inhibitors and release the corrosion inhibitor when the nanoparticle is exposed to a triggering event or environment. Again such nanoparticles may have a size less than 999 nm, and may include, but are not limited to, nano-silica, magnesium oxide, nano-iron oxide, nano-copper oxide, nano-zinc oxide, nano-alumina, nano-boron, carbon black, nano-graphene, carbon nanotube, ferromagnetic nanoparticles, nanoplatelets, surface-modified nanoparticles, halloysite clay nanotubes, polymer-based degradable nanoparticles, nanocapsules multistimuli-responsive nanospheres, core/shell nanoparticles and combinations thereof. The encapsulated corrosion inhibitors may include, but are not necessarily limited to, scavenger materials for oxygen, hydrogen sulfide ($H_2S$), carbon dioxide, carbonyl sulfide (COS), hydrogen cyanide (HCN), carbon disulfide ($CS_2$), and mixtures thereof. The encapsulated corrosion inhibitor is released when the nanoparticle is subjected to a specific triggering mechanism providing a self-healing corrosion protection. Suitable triggering mechanisms include, but are not necessary limited to, changes of pH, temperature, electrolyte type or concentration, or application of a magnetic or electromagnetic field. U.S. Patent Application Publication No. 2009/0078153 describes corrosion inhibiting pigments comprising nanoreservoirs of corrosion inhibitor. The corrosion inhibitor is released upon the action of a trigger. This publication is incorporated by reference herein in its entirety.

Completion fluids are also expected to benefit from the presence of nanoparticles within them. Completion fluids generally do not contain solids, however, because of the extremely small size of nanoparticles, their presence may be tolerated in low proportions while still imparting an improvement in a property or properties to the completion fluid. For instance, improvements in fluid loss and viscosity of clear brines may help seal off permeability without the formation of a filter cake in the usual way that "filter cake" is understood. For instance, it is expected that an internal structure, that is, in the near wellbore region, not a "cake" on the wellbore surface, formed from drilling solids and nanoparticles, without otherwise added solids, may usefully serve to regulate permeability. Because of the small size of the nanoparticles, they may pass through the pores of the near wellbore region to form an internal structure that regulates permeability. The electrical or other forces that hold them together would create a structure that regulates permeability. Similarly, once those forces are disrupted and the permeability control is no longer needed, the nanoparticles may be readily produced back from the near wellbore region due to their small size. Because of the much greater surface area of nanoparticles compared to micron-sized and larger particles, only about 1 ppg (0.12 kg/liter) of nanoparticles may do the job of 10 ppg (1.2 kg/liter) of other analogous materials. The reduced solid volumes with increased surface area would thus help maintain equivalent viscosities of such completion fluids.

Nanoparticles expected to be useful components of completion fluids include, but are not necessarily limited to nano-silica, nano-alumina, nano-zinc oxide, nano-boron, nano-iron oxide, zeolites carbonates, piezoelectric crystals, pyroelectric crystals and combinations thereof (see U.S. Pat. No. 7,559,369 and U.S. Patent Application Publication No. 2009/0312201 A1, both incorporated herein by reference in their entirety). It is expected that the proportions of such nanoparticles useful to provide beneficial properties to completion fluids may range from about 5 to about 150,000 ppm; alternatively from about 5 to about 50,000 ppm.

It is additionally expected that nanoparticles may serve as lost circulation additives in drilling fluids, either alone or together with conventional additives such as carbonates, barite, ilemite, manganese tetroxide, manganous oxide, magnesium oxide, etc. when such conventional additives are sized as normally, but also when reduced to nano-scale sizes where they may be more effective. That is, new materials, alone or together with conventional materials, whether of conventional size or of a nanoscale size may be suitable lost circulation additives because of how they may associate with each other and other structures (such as the wellbore wall) downhole, either by electrical charge or other surface interaction due to their inherent properties or due to certain functional groups on the surfaces thereof. In non-limiting examples, nano-sized calcium carbonate or nano-sized barite may be employed. Fibers of either nano-scale and/or conventional scale may also usefully connect, associate or bond with these materials reduce fluid losses. Associations formed in this way may form useful plugs. The potential to form a thin, non-erodible and largely impermeable structure similar in function to a filter cake with well-dispersed and tightly packed "fabric" and structural nanoparticles, nanoparticle-based fluids may be expected to eliminate or reduce the scope of reservoir damage while improving well productivity. Because of the large surface area to volume ratio of nanoparticles in these structures, cleaning compositions and methods used before completing a well may remove these structures easily from the borehole wall by permitting intensive interactions with the drilling fluid. Thus, the contradictory requirements of a structure that prevents loss of fluid into the reservoir during drilling, but which is easily removable before completion is particularly advantageous for drilling fluids containing nanoparticles. Stated another way, properly designed and engineered nanoparticles have the potential to build structural barriers according to the size and shape of the fluid loss paths are expected to provide effective sealing of the porous and permeable zones, and naturally fractured formations. Multifunctional nanoparticles may possess both sealing and strengthening potential, which is expected to reduce the scope of induced lost circulation.

Other new potential nanoparticles useful as lost circulation additives include, but are not necessarily limited to, nanoparticles physically or chemically bonded to porous or non-porous microparticles (particle size greater than 100 nm), which may impart some properties of the nanoparticles onto the microparticles. Functional groups on nano-sized particles expected to be useful to prevent lost circulation include, but are not necessarily limited to, nano-silica, nano-alumina, nano-zinc oxide, nano-boron, nano-iron oxide, zeolites carbonates, piezoelectric crystals, pyroelectric crystals and combinations thereof (again please see U.S. Pat. No. 7,559,369 and U.S. Patent Application Publication No. 2009/0312201 A1), as well as encapsulated nanoparticles. It is expected that the proportions of such nanoparticles useful to improve lost circulation may range from about 5 to about 100,000 ppm; alternatively from about 5 to about 50,000 ppm.

In another non-restrictive embodiment nanoparticles may be used to encapsulate or otherwise incorporate a gel-forming additive. Suitable nanoparticles include, but are not necessarily limited to, nano-silica, nano-barium sulfate, nano-magnesium oxide, nano-iron oxide, nano-copper oxide, nano-zinc oxide, nano-alumina, nano-boron, carbon black, nano-graphene, carbon nanotube, ferromagnetic nanoparticles, nanoplatelets, surface-modified nanoparticles, halloysite clay nanotubes, polymer-based degradable nanoparticles, nanocapsules multistimuli-responsive nanospheres, core/shell nanoparticles and combination thereof. The nanoparticles present in the fluid may contain encapsulated or incorporated a gel forming additive including but not limited to polyacrylamide, crosslinking agents, in situ crosslinkable polymer, superabsorbent polymers and the like that are released by applying a triggering mechanism which includes but is not necessary limited to changes of pH, temperature, electrolyte type or concentration, or application of a magnetic or electromagnetic field. Once triggered, the encapsulated gel forming additive would be released and be permitted to function, for instance to be active to form gel with increased volume on contact with water, hydrate and expand in the presence of formation water, thus plugging the pores and blocking water movement. Such materials would conversely dehydrate and shrink when they contacted oil, hence allowing the oil to flow preferential to any water flow. Generally, such an application where oil is permitted to selectively flow while formation water is inhibited or prevented may be termed "water shutoff".

Shallow water flow problems associated with deep water drilling may also be addressed using nanoparticles. Due to their small size, these particles may easily pass through the pores and inter-granular boundaries of the shallow water flow sand zone and the porous and permeable matrix of the shallow water flow sand. Thus, engineered nanoparticles with gluing, sealing, filling and cementation properties are expected to increase the inter-granular bond strength, reduce porosity and permeability of the near wellbore formations with a drastic increase in tearing and shearing resistance of the particles in the shallow water flow zone. Such engineered nanoparticles would be expected to reduce the matrix flow potential of the shallow water flow zone due to effective sealing of the near-wellbore zone. Due to the inter-particle bonding and matrix strengthening effect of the nano fluid to the near-wellbore shallow water flow zone, it is also expected to improve the borehole and sea bed equipment stability used in offshore drilling and production. However, in one non-limiting embodiment the drilling fluids or completion fluids have an absence of cement nanoparticles.

These properties of nanoparticles may also be understood to consolidate unconsolidated formations to form bonded networks of particles within the formation to create an integrated ring of rock mass around the borehole wall. Such a nanoparticle-enhanced rock cylinder in the near wellbore region may tolerate much higher in-situ stresses to avoid collapse as well as undesirable fracturing of the formation.

The invention will now be illustrated with respect to certain examples which are not intended to limit the invention in any way but simply to further illustrate it in certain specific embodiments.

Example 1

Although different from the methods described herein, the effectiveness of adding latex nanoparticles to water based muds in controlling pore pressure transmission and therefore enhancing near wellbore region tolerance to higher in-situ stresses and wellbore strengthening are reported in U.S. Pat. No. 6,703,351 incorporated herein by reference in its entirety. The drilling fluids as described herein do not require and have an absence of a precipitating agent recited in U.S. Pat. No. 6,703,351.

Figure 1:
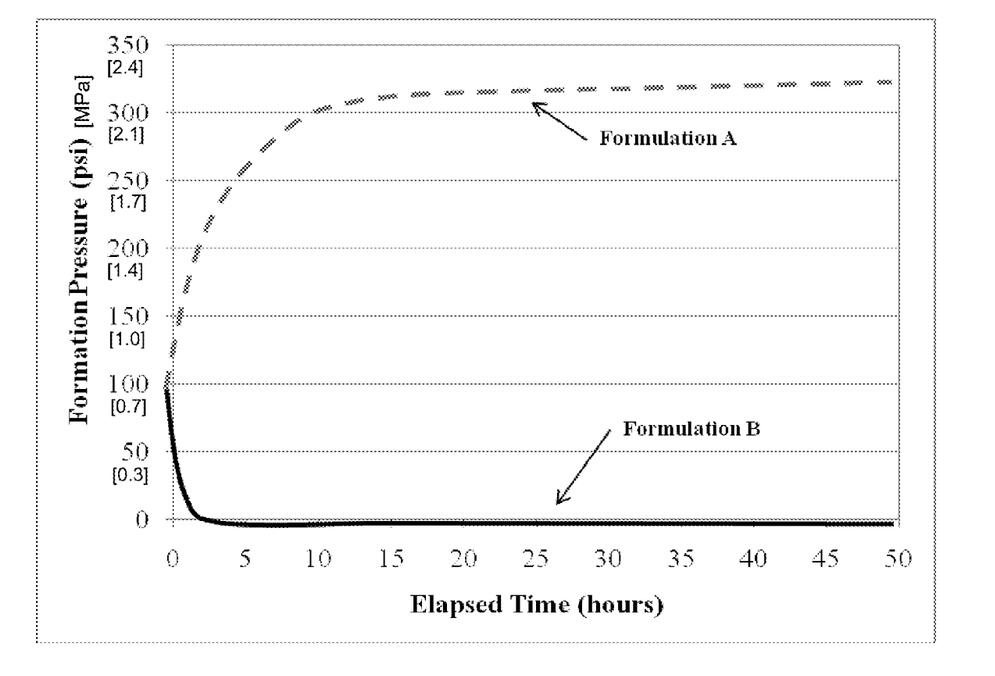
FIG. 1 is a graph comparison of the pore pressure transmission performances for two water-based fluid systems with and without added nanoparticles (Formulation A and B respectively).

Shown in FIG. 1 is a graph comparison of the pore pressure transmission performances for two water-based fluid systems without and with added nanoparticles (Formulation A and B respectively). The formulations are set out in Table 1. The experiment simulates downhole rock stress and overbalance fluid pressure conditions and it shows the effectiveness of the added nanoparticles in controlling pore pressure transmission and therefore enhancing near wellbore region tolerance to higher in-situ stresses and wellbore strengthening.

TABLE 1

Formulations of Water-Based Fluid Systems with and without Added Nanoparticles

| Products | Formulation A | Formulation B |
|---|---|---|
| Water, bbl (liters) | 0.81 (129) | 0.81 (129) |
| Viscosifier Agent, lb/bbl (grams/liter) | 0.5 (1.4) | 0.5 (1.4) |
| Shale control agent/Viscosifier, lb/bbl (grams/liter) | 0.5 (1.4) | 0.5 (1.4) |
| Fluid loss control agent, lb/bbl (grams/liter) | 4 (11.4) | 4 (11.4) |
| Shale stabilizer, lb/bbl (grams/liter) | 5 (14.3) | 5 (14.3) |
| Antiflocculat, lb/bbl (grams/liter) | 2 (5.7) | 2 (5.7) |
| NaCl, lb/bbl (grams/liter) | 73 (209) | 73 (209) |
| Nanoparticles with an average size of 300 nm, vol % | — | 3 |

In the foregoing specification, the invention has been described with reference to specific embodiments thereof, and has been suggested as effective in providing effective methods and compositions for improving drilling fluids and completion fluids used in drilling and completing subterranean reservoirs and formations. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of components and/or reaction conditions for forming the nanoparticles, whether modified to have particular shapes or certain functional groups thereon, but not specifically identified or tried in a particular drilling or completion fluid to improve the properties therein, are anticipated to be within the scope of this invention. Further, specific combinations of fluids, nanoparticles, surfactants and other components different than those described or exemplified are expected to be within the scope of the methods and compositions herein, as set encompassed in the appended claims.

The present invention may suitably comprise, consist or consist essentially of the elements disclosed and may be practiced in the absence of an element not disclosed. For instance, the drilling fluid may consist of or consist essentially of the base fluid and nanoparticles, as further defined in the claims. Alternatively, the drilling fluid may consist of or consist essentially of the base fluid, the nanoparticles and a surfactant, as further defined in the claims. In each of these examples, the drilling fluid may contain conventional additives.

The words "comprising" and "comprises" as used throughout the claims is to be interpreted as meaning "including but not limited to".

What is claimed is:

1. A drilling fluid comprising:
a base fluid selected from the group consisting of an aqueous fluid, a non-aqueous fluid and combinations thereof, where the base fluid comprises a continuous phase;
solid particles suspended in the continuous phase; and
nanoparticles having a size less than 999 nm, selected from the group consisting of:
deformable polymer latex nanoparticles selected from the group consisting of polyethylene, polymethyl methacrylate, carboxylated styrene/butadiene copolymer, polyvinylacetate copolymer, polyvinyl acetate/vinyl chloride/ethylene copolymer, polyvinyl acetate/ethylene copolymer, natural latex, polyisoprene, polydimethylsiloxane and combinations thereof;
metal oxides selected from the group consisting of silica, magnesium oxide, iron oxide, manganese oxide, copper oxide, zinc oxide, nickel oxide, alumina and combinations thereof; boron; carbon; carbon black; graphitized carbon; graphene; ferromagnetic nanoparticles; nanoplatelets; halloysite clay nanotubes;
polymer-based nanoparticles selected from the group consisting of polyethylene oxide, polyaramids, polyaniline, polyvinyl alcohol, polystyrene, polyacrylonitrile, nylon, polyester, cellulose and combinations thereof;
degradable nanoparticles; nanocapsules; mesoporous nanoparticles; multistimuli-responsive nanospheres; core/shell nanoparticles; nitrides; carbides; carbon nanotubes; coated nanofibers; carbon-based nanoparticles, metallic-based nanoparticles, Ni-based nanoparticles, and those nanoparticles with functional groups selected from the group consisting of SH; $NH_2$; NHCO; OH; COOH; F; Br; Cl; I; H; R—NH, R—O, R—S, where R is selected from the group consisting of low molecular weight organic chains with a carbon number on average to 10 or less and combinations thereof; CO; COCl; and SOCl; and
compositions selected from the group consisting of calcium carbonate; potassium carbonate; $TiO_2$; $Mg(OH)_2$; $Fe_2O_3$; $Fe_3O_4$; $CeO_2$; $Mn_3O_4$, SiC; $Si_3N_4$; and mixtures thereof;
where the nanoparticles are present in the fluid in an amount effective to have an effect selected from the group consisting of:
associate with shale of a subterranean formation adjacent a wellbore to stabilize the shale as compared with an identical drilling fluid absent the nanoparticles;
modify the electrical conductivity of the fluid as compared with an identical drilling fluid absent the nanoparticles;
increase the rheological stability of the fluid over a temperature range from ambient up to about 320° C. and a pressure range of from about atmospheric pressure up to about 350 MPa, as compared with an identical drilling fluid absent the nanoparticles;
reduce the drag of the fluid as compared with an identical drilling fluid absent the nanoparticles;
increase the stability of an emulsified fluid as compared with an identical drilling fluid absent the nanoparticles, where the base fluid is an emulsion of an aqueous fluid and a non-aqueous fluid;
reverse the wettability of a downhole material selected from the group consisting of filter cake, drill cuttings, wellbore surfaces, casing, downhole equipment and combinations thereof;
lessen the corrosion of equipment contacted by the drilling fluid as compared with an identical drilling fluid absent the nanoparticles, where the equipment comprises a material selected from the group consisting of stainless steel, duplex steel, chrome steel, martensitic alloy steels, ferritic alloy steels, austenitic stainless steels, precipitation-hardened stainless steels, high nickel content steels, and combinations thereof; and
improve fluid loss by increased viscosity as compared with an identical drilling fluid absent the nanoparticles.

2. The drilling fluid of claim 1 where the nanoparticles have at least one dimension less than 100 nm.

3. The drilling fluid of claim 1 further comprising a surfactant in an amount effective to suspend the nanoparticles in the base fluid.

4. The drilling fluid of claim 1 where the nanoparticles have an electrical charge.

5. The drilling fluid of claim 1 where the nanoparticles are functionalized nanoparticles having at least one functional group selected from the group consisting of sulfonate, sulfate, sulfosuccinate, thiosulfate, succinate, carboxylate, hydroxyl, glucoside, ethoxylate, propoxylate, phosphate, ethoxylate, ether, amines, amides and combinations thereof.

6. The drilling fluid of claim 1 where the nanoparticles are functionalized nanoparticles having at least two functional groups where:
one functional group is a hydrophilic group; and
a second functional group is a hydrophobic group.

7. The drilling fluid of claim 1 where the amount of nanoparticles in the drilling fluid range from about 5 ppm to about 150,000 ppm.

8. The drilling fluid of claim 1 where the nanoparticles are functionalized nanoparticles with a polar and a non-polar group.

9. The drilling fluid of clam 1 where:
the nanoparticles are selected from the group consisting of silica, magnesium oxide, iron oxide, copper oxide, zinc oxide, nickel oxide, alumina, boron, carbon black, graphene, carbon nanotubes, ferromagnetic nanoparticles, nanoplatelets, surface modified nanoparticles, halloysite clay nanotubes, polymer-based nanoparticles, degradable nanoparticles, nanocapsules, mesoporous nanoparticles, multistimuli-responsive nanospheres, core/shell nanoparticles, and combinations thereof; which are functionalized with functional group selected from the group consisting of sulfonate, sulfate, sulfosuccinate, thiosulfate, succinate, carboxylate, hydroxyl, glucoside, ethoxylate, propoxylate, phosphate, ethoxylate, ether, amines, amides, and combinations thereof; and
the nanoparticles are present in the fluid in an amount effective to reverse the wettability of a downhole material selected from the group consisting of filter cake, drill cuttings, wellbore surfaces, casing, downhole equipment and combinations thereof.

10. The drilling fluid of claim 1 where:
the nanoparticles are selected from the group consisting of scavenger materials for oxygen, hydrogen sulfide and carbon dioxide, carbonyl sulfide, hydrogen cyanide, carbon disulfide and mixtures thereof; and
where the drilling fluid is in contact with equipment prepared from materials selected from the group consisting of stainless steel, duplex steel, chrome steel, martensitic alloy steels, ferritic alloy steels, austenitic stainless steels, precipitation-hardened stainless steels, high nickel content steels, and combinations thereof; and
the nanoparticles are present in the fluid in an amount effective to lessen the corrosion of the equipment as compared with an identical drilling fluid absent the nanoparticles.

11. The drilling fluid of claim 10 where the nanoparticles are selected from the group consisting of nano-silica, nano-magnesium oxide, nano-iron oxide, nano-copper oxide, nano-zinc oxide, nano-nickel oxide, nano-alumina, nano-boron, carbon black, nano-graphene, carbon nanotubes, ferromagnetic nanoparticles, nanoplatelets, surface modified nanoparticles, halloysite clay nanotubes, polymer-based nanoparticles, degradable nanoparticles, nanocapsules, mesoporous nanoparticles, multistimuli-responsive nanospheres, core/shell nanoparticles, and combinations thereof.

12. The drilling fluid of claim 10 where the nanoparticles are functionalized nanoparticles having at least one functional group selected from the group consisting of sulfonate, sulfate, sulfosuccinate, thiosulfate, succinate, carboxylate, hydroxyl, glucoside, ethoxylate, propoxylate, phosphate, ethoxylate, ether, amines, amides, and mixtures thereof.

* * * * *